United States Patent
Fang

(10) Patent No.: US 8,705,326 B2
(45) Date of Patent: Apr. 22, 2014

(54) COPY PROTECTION METHOD FOR OPTICAL STORAGE DEVICE

(71) Applicant: Ko Cheng Fang, New Taipei (TW)

(72) Inventor: Ko Cheng Fang, New Taipei (TW)

( * ) Notice: Subject to any disclaimer, the term of this patent is extended or adjusted under 35 U.S.C. 154(b) by 0 days.

(21) Appl. No.: 13/900,186

(22) Filed: May 22, 2013

(65) Prior Publication Data

US 2013/0336102 A1 Dec. 19, 2013

(30) Foreign Application Priority Data

Jun. 18, 2012 (TW) .............................. 101121683 A

(51) Int. Cl.
*G11B 11/00* (2006.01)

(52) U.S. Cl.
USPC .................. 369/13.35; 369/13.38; 369/275.2; 369/284; 369/53.21

(58) Field of Classification Search
USPC .......... 369/13.35, 275.2, 13.38, 275.1, 13.31, 369/13.29, 13.05, 110.01, 284
See application file for complete search history.

(56) References Cited

U.S. PATENT DOCUMENTS

| | | | | |
|---|---|---|---|---|
| 7,251,200 | B2 * | 7/2007 | Miyatake et al. | ........... 369/13.31 |
| 7,414,924 | B2 * | 8/2008 | Oshima et al. | ............. 369/13.35 |
| 7,590,031 | B2 * | 9/2009 | Miyatake et al. | .......... 369/13.38 |

* cited by examiner

*Primary Examiner* — Ali Neyzari
(74) *Attorney, Agent, or Firm* — Rabin & Berdo, P.C.

(57) ABSTRACT

A copy protection method includes the steps of providing an optical storage device having a substrate layer and a data structure layer coated on the substrate layer and containing a set of raw data codes; forming on the data structure layer at least one polarizing layer capable of causing a change in a light beam; and forming on the polarizing layer a scratch protection layer. The polarizing layer is located between the data structure layer and an optical reading device to influence a light beam irradiated thereon by the optical reading device, so that the set of raw data codes being optically accessed is conditionally converted into a different set of physical data codes. By providing the polarizing layer on the optical storage device to change the data codes that can be obtained by the optical reading device, it is able to stop illegal copying of the optical storage device.

10 Claims, 7 Drawing Sheets

---

Form on a top of a data structure layer of an optical storage device a polarizing layer capable of causing a change in a light beam irradiated thereon; and the polarizing layer can be formed of a photosensitive chemical or a light-degradable chemical.

Use an optical reading device to project a light beam through the polarizing layer to access the data structure layer of the optical storage device.

Cause the optical reading device to obtain a set of raw data codes when the number of times the optical storage device is read by the optical reading device does not exceed a value preset for causing a change in the polarizing layer.

Cause the optical reading device to obtain a different set of physical data codes, which is irreversibly converted from the set of raw data codes due to a change of the polarizing layer, when the number of times the optical storage device is read by the optical reading device exceeds the value preset for causing a change in the polarizing layer.

Form on a top of a data structure layer of an optical storage device a polarizing layer capable of causing a change in a light beam irradiated thereon; and the polarizing layer can be formed of a photosensitive chemical or a light-degradable chemical.

Use an optical reading device to project a light beam through the polarizing layer to access the data structure layer of the optical storage device.

Cause the optical reading device to obtain a set of raw data codes when the number of times the optical storage device is read by the optical reading device does not exceed a value preset for causing a change in the polarizing layer.

Cause the optical reading device to obtain a different set of physical data codes, which is irreversibly converted from the set of raw data codes due to a change of the polarizing layer, when the number of times the optical storage device is read by the optical reading device exceeds the value preset for causing a change in the polarizing layer.

FIG. 3

COPY PROTECTION METHOD FOR OPTICAL STORAGE DEVICE

FIELD OF THE INVENTION

The present invention relates to a copy protection technique applied to various types of optical disks, such as CD (Compact Disc), VCD (Video Compact Disc), DVD (Digital Versatile Disc) and BD (Bin-ray Disc); and more particularly, to a copy protection method, in which a photosensitive, a light-degradable or a periodically changeable polarizing material is added to an optical storage disc to manipulate the data codes that can be read by an optical reading device from the optical storage disc.

BACKGROUND OF THE INVENTION

Optical storage discs have become available for more than 15 years. Majority of users request for the right to reasonably copy optical storage discs, and many countries have established laws on protection of general users' right to the use of optical storage discs within a legally permitted scope. However, the so-called "reasonably copy" also causes the problem of "illegal reproduction" and hence serious loss to copyrighters.

In the past ten years, many copy protection techniques had been developed and announced. Majority of the existing copy protection techniques involve damaging of the optical disc surface; including logical damage developed based on the optical disc specification or physical damage produced during the optical disc manufacturing process. Recently, quite a few special copy software programs have become available. They utilize the reset time of the optical disc drive or check the actual time used to read the optical disc to circumvent the logical damage or the physical damage formed on the optical disc. As a result, either the logical or the physical damage on the optical disc surface fails to effectively prevent the optical disc from being illegally copied without authorization.

Optical discs utilizing the hybrid copy protection technique that combines encryption, logical damage and physical damage can be now arbitrarily copied simply using some copy software. Even though the decoding software and the reverse engineering of software are clearly prohibited by the existing copyright law, it is still very difficult to completely stop users from copying optical discs without authorization.

Even for some mega-manufacturers, who use non standard optical disc burning software and at the same time manufacture non standard optical disc drives for reading a "unique mark" on the optical discs, also encounter with the threat of decoding of software or reverse engineering of software in the forms of firmware or plug-in; and their copy protection means are cracked by the firmware or plug-in. This is not because the unique mark is a wrong idea but because the unique mark can only be read out by the non standard optical disc drive. A cracker can easily crack the copy protection by circumventing the reading of the unique mark.

However, in this event every optical disc is provided with a really unique mark that must be read accurately for decoding accurately, it would then be very difficult for the crackers to crack the copy protection by using some plums in or by circumventing the reading of the unique mark. Only in this way, it is possible to overwhelmingly suppress reproduction without authorization.

Currently, all the commercially available copy software or advanced optical disc drives are able to quickly detect various copy protection means equipped on the optical discs. In the past, a physical damage (bad sectors) was utilized as a copy protection means for optical discs, Nowadays, since the newest optical disc drives can be reset at a very quick speed, such physical damage cannot stop the reading of the advanced optical disc drives. Contents of the original data can still be read out from among bad sectors. In view of these adverse conditions, it is necessary to develop an innovative copy protection technique for optical storage devices so as to eliminate the serious problem of reproduction without authorization.

SUMMARY OF THE INVENTION

A primary object of the present invention is to provide a copy protection method for optical storage device, according to which a polarizing structure is formed on an optical storage disc, such that different contents will be obtained by an optical reading device when the optical storage disc is repeatedly read different numbers of times by the optical reading device. With this characteristic, the optical storage device with the polarizing structure manufactured according to the copy protection method of the present invention is completely different from the write-once discs and the rewritable discs that are currently available in the market, and its characteristic as described above could not be reproduced with any kind of copying method. Therefore, the copy protection method of the present invention shall serve to effectively protect an author's copyright.

Another object of the present invention is to provide a copy protection method for optical storage device, according to which a photosensitive or a light-degradable material subject to permanent polarization is added to a surface of a data structure layer on an optical disc during manufacturing thereof for manipulating the data codes that can be read out from the optical storage disc by an optical reading device, so that an optical storage device can be determined road as an authorized copy or not according to the existence of such polarizing structure.

A further object of the present intervention is to provide a copy protection method for optical storage device, according to which a material subject to periodically temporary, polarization is added to a surface of a data structure layer on an optical storage disc during manufacturing thereof for manipulating the data codes that can be read out from the optical storage disc by an optical reading device, so that unauthorized copying of the optical storage disc by users can be stopped.

To achieve the above and other objects, the copy protection method for optical storage device according to the present invention includes the following steps: providing an optical storage device that includes a bottom substrate layer and a data structure layer coated on a top of the bottom substrate layer which containing a set of raw data codes; forming on a top of the data structure layer at least one polarizing layer capable of causing a change in a beam of light irradiated by an optical reading device; and forming on a top of the polarizing layer a protective layer for protecting the polarizing layer, the data structure layer and the bottom substrate layer against scratches. Whereby, when using the optical reading device to access the data structure layer on the optical storage device, the polarizing layer is located in-between the data structure layer and the optical reading device to govern the light beam irradiated onto the data structure layer by the optical reading device, so that the set of raw data codes contained in the data structure layer being optically accessed is converted into a different set of physical data codes.

According to the present invention, the optical storage device can be an optical storage disc specification selected from the group consisting of CD (Compact Disc), VCD (Video Compact Disc), DVD (Digital Versatile Disc), EVD (Enhanced Versatile Disc), FVD (Forward Versatile Disc), HVD (High-definition Versatile Disc), VMD (Versatile Multilayer Disc), UMD (Universal Media Disc), and BD (Blu-ray Disc); and the polarizing layer is formed on top of the data structure layer by spray coating, attaching or plating to cover a whole area of the data structure layer.

However, to prevent users from easily finding the provision and the locations of the polarizing layer on the optical storage device, the polarizing layer can be otherwise formed on a partial area of the data structure layer. Further, the partial area of the data structure layer may be in the form of one single block or multiple discontinuous areas.

In an operable embodiment of the present invention, the polarizing layer is formed of a photosensitive or a light-degradable chemical that is subject to an irreversible change after being read a preset number of times. In this case, when the optical reading device reads the optical storage device and obtains the set of raw data codes, it is determined the optical storage device is being accessed with authorization; while on the other hand, when the optical reading device reads the optical storage device and obtains the set of physical data codes, it is determined the optical storage device is being accessed without authorization.

In another operable embodiment of the present invention, the polarizing layer is formed of a chemical that is subject to a periodically temporary change after being read a preset number of times. In this case, when the optical reading device reads the optical storage device and obtains the set of raw data codes, it is determined the optical storage device is being accessed with authorization: and on the other hand, when the optical reading device reads the optical storage device and obtains the set of physical data codes, it is determined the optical storage device is being accessed without authorization. Moreover, in this case, the set of physical data codes will be converted back into the set of raw data codes when the optical storage device is not irradiated by a light beam again within a preset period of time.

The present invention is characterized in forming a polarizing layer on an optical storage device for governing the light beam irradiated thereon, so that different data contents will be obtained by an optical reading device when it repeatedly reads the optical storage device different numbers of times. As it is known, the conventional copy software help users to exactly write the values or results read out from an authorized copy to another disc. When a user uses a copy software, which is not a particularly designated software, to copy an optical storage device manufactured according to the copy protection method of the present invention, the copy software would be unable to know which section that has been repeatedly read is assigned as a copy protection area, and the copied disc is nonfunctional. Even if a recognizer program has been exactly copied to another optical disc, it knows the copied optical disc being played is an unauthorized copy.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein FIG. 1 schematically shows the use of an optical reading device to read data from an optical storage device manufactured with the copy protection method according to the present invention;

FIG. 3 is a flowchart showing the steps included in the copy protection method for optical storage device according to a first preferred embodiment of the present invention;

DETAILED DESCRIPTION OF THE PREFERRED EMBODIMENTS

The present invention will now be described with some preferred embodiments thereof and with reference to the accompanying drawings.

Figure 1:
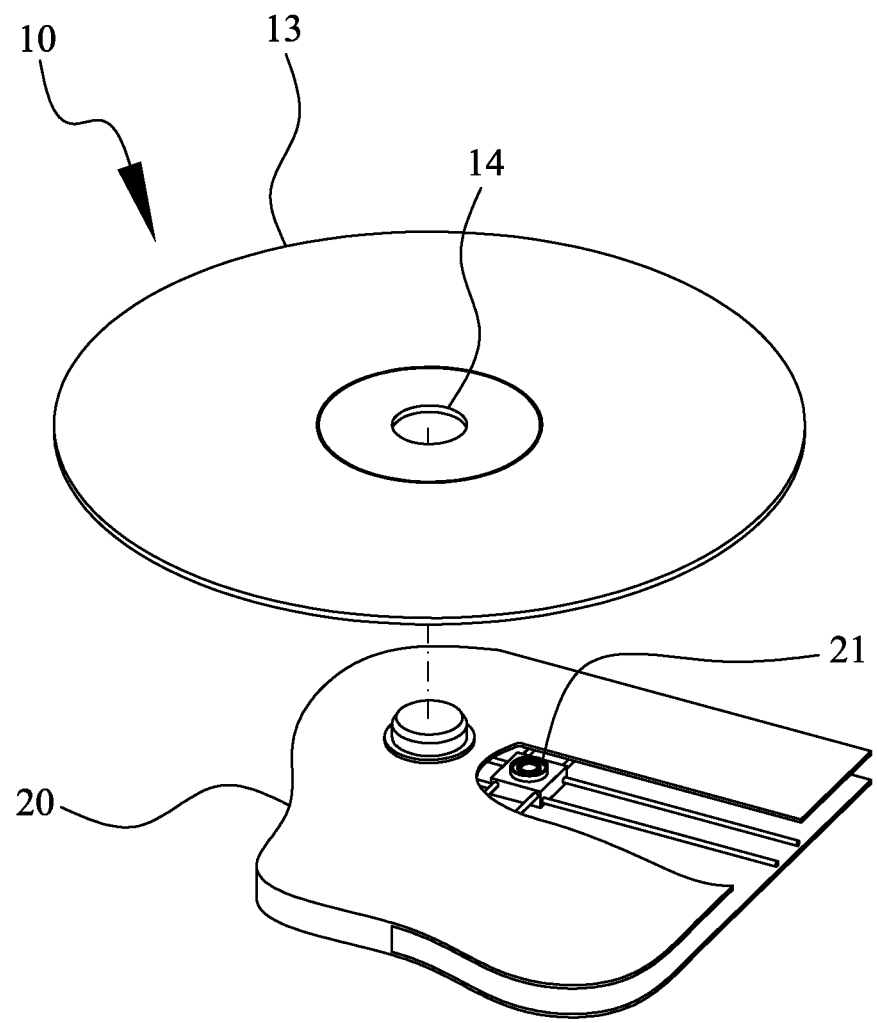
Figure 2:
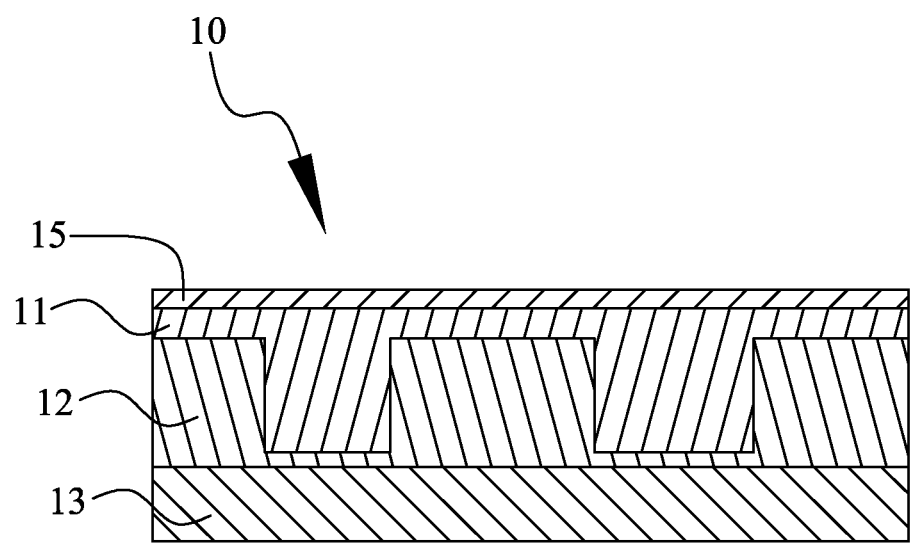
FIG. 2 is a cross sectional view showing the structure layers of the optical storage device manufactured with the copy protection method of the present invention according to a preferred embodiment thereof.

Please refer to FIGS. 1 and 2. A copy protection method for optical storage device according to the present invention is characterized in providing an optical storage device 10 with at least one polarizing layer 11 capable of causing a change in a beam of light projected onto the optical storage device 10, and having the polarizing layer 11 located between a data structure layer 12 of the optical storage device 10 and a pick-up head 21 of an optical reading device 20 when the optical storage device 10 is accessed by the optical reading device 20.

In the illustrated embodiment, the optical storage device 10 can have an optical disc specification selected from the group consisting of CD (Compact Disc), VCD (Video Compact Disc), DVD (Digital Versatile Disc), EVD (Enhanced Versatile Disc), FVD (Forward Versatile Disc), HVD (High-definition Versatile Disc), VMD (Versatile Multilayer Disc), UMD (Universal Media Disc), and BD (Blu-ray Disc).

The optical storage device 10 includes a circular substrate layer 13 having a center hole 14. The data structure layer 12 is coated on a top of the substrate layer 13 and contains a set of raw data codes 16 (see FIG. 6A). In view that the data structure layer 12 has write format and method the same as related international standards and can be read with any commercially available optical disc drive, the polarizing layer 11 is additionally formed on a top of the data structure layer 12 to govern the light beam irradiated onto the optical storage device 10. When the optical reading device 20 accesses the data structure layer 12, the set of raw data codes 16 is converted into a different set of physical data codes 17 (see FIG. 6B) due to an effect of the polarizing layer 11. A transparent protective layer 15 is further provided on a top of the polarizing layer 11 to protect the polarizing layer 11, the data structure layer 12, and the substrate layer 13 against scratches that might prevent the optical reading device 20 from successfully accessing data from the optical storage device 10.

According to operable embodiments of the present invention, the polarizing layer 11 can be formed on the top of the data structure layer 12 by spray coating, attaching, plating or other different ways to change the light beam irradiated thereon. With the effect of the polarizing layer 11, two different sets of data codes can be obtained from one single optical storage device 10 being accessed by the optical reading device 20.

Please refer to FIG. 3. According to a first preferred embodiment of the present invention, the optical storage device copy protection method includes the step of forming a polarizing layer 11 on a top of a data structure layer 12 of an optical storage device 10 for enabling a change in a light beam irradiated on the optical storage device 10, and the polarizing layer 11 being formed of a photosensitive chemical or a light-degradable chemical that is subject to an irreversible change. An optical reading device 20 can be used to project a beam of light through the polarizing layer 11 to access the data structure layer 12 of the optical storage device 10. The optical reading device 20 will obtain a set of raw data codes 16 when the number of times the optical storage device 10 is read by the optical reading device 20 does not exceed a value preset for the polarizing layer 11 to change; and on the other hand, the optical reading device 20 obtains a different set of physical data codes 17, which is permanently converted from the set of raw data codes 16 due to a change of the polarizing layer 11 when the number of times the optical storage device 10 is read by the optical reading device 20 exceeds the value preset for the polarizing layer 11 to change.

Based on this design, the number of times the optical storage device 10 is read can be restricted to a preset value for using as a reference in determining whether the optical storage device 10 is accessed under legal authorization. In the case the number of times the optical storage device 10 is read does not exceed the value preset for the chemical forming the polarizing layer 11 to change, the optical reading device 20 determines according to an application program thereof the set of raw data codes 16 is obtained data with authorization. However, in the case the number of times the optical storage device 10 is read exceeds the value preset for the chemical forming the polarizing layer 11 to change, the polarizing layer 11 would change to govern the light beam projected by the optical reading device 20 onto the optical storage device 10, and the optical reading device 20 determines according to the designated software thereof the set of physical data codes 17 is obtained data without authorization.

Figure 4:
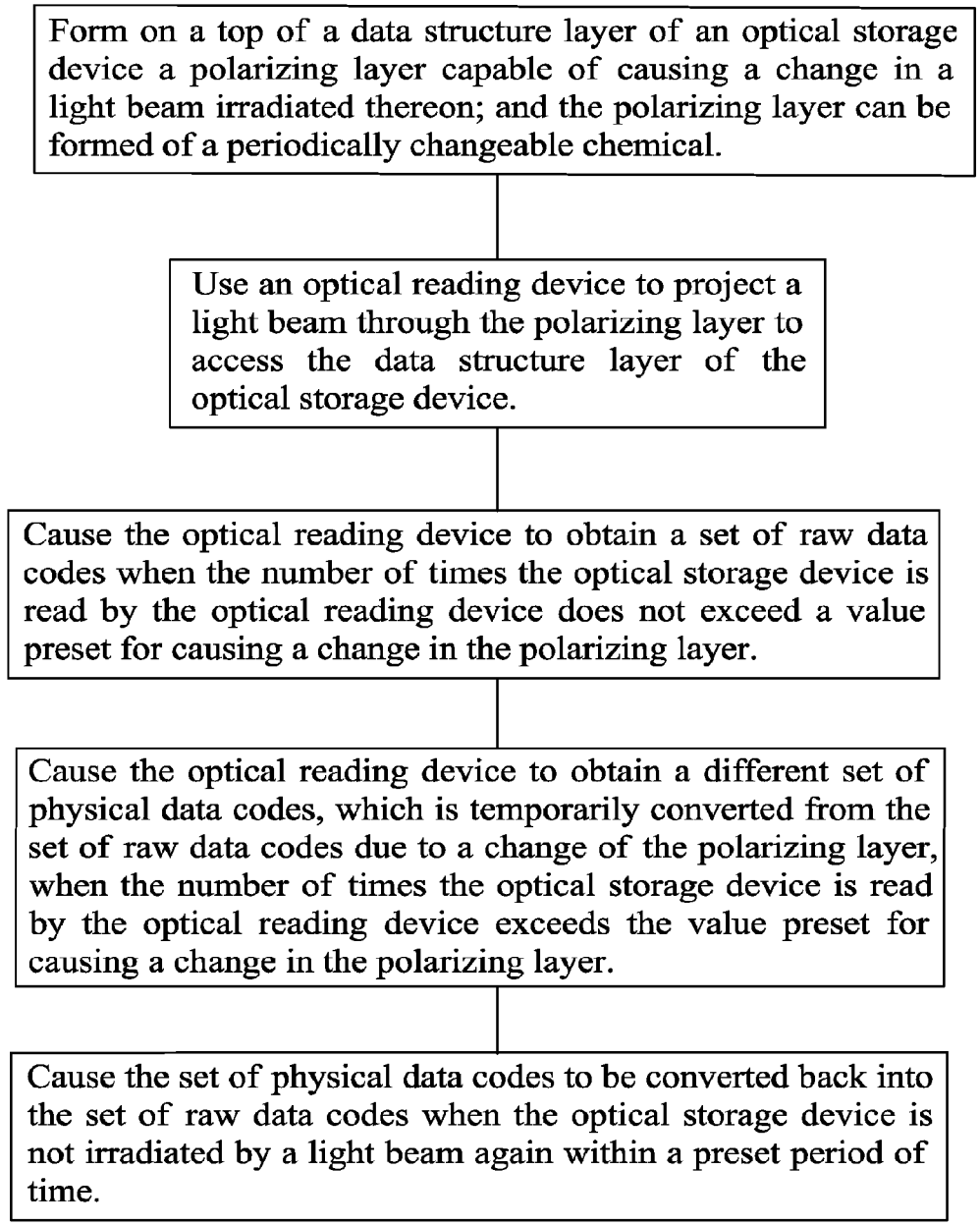
FIG. 4 is another flowchart showing the steps included in the copy protection method for optical storage device according to a second preferred embodiment of the present invention.

Please refer to FIG. 4. According to a second preferred embodiment of the present invention, the optical storage device copy protection method includes the step of forming of a polarizing layer 11 on a top of a data structure layer 12 of an optical storage device 10 for enabling a change in a light beam irradiated on the optical storage device 10, and the polarizing layer 11 being formed of a type of chemical that is subject to periodically temporary change. An optical reading device 20 can be used to project a beam of light through the polarizing layer 11 to access the data structure layer 12 of the optical storage device 10. The optical reading device 20 will obtain a set of raw data codes 16 when the number of times the optical storage device 10 is read by the optical reading device 20 does not exceed a value preset for the polarizing layer 11 to change; and on the other hand, the optical reading device 20 obtains a different set of physical data codes 17, which is temporarily converted from the set of raw data codes 16 due to a change of the polarizing layer 11, when the number of times the optical storage device 10 is read by the optical reading device 20 exceeds the value preset for the polarizing layer 11 to change. Then, the set of physical data codes 17 will be converted back into the set of raw data, codes 16 when the optical storage device 10 is not irradiated by a light beam again within a preset period of time.

Therefore, through pre-programming, it is possible for the optical reading device 20 to access the optical storage device 10 and obtain the set of physical data codes 17 that contains incorrect data when the number of times the optical storage device 10 is read by the optical reading device 20 exceeds the value preset for the polarizing layer 11 of the optical storage device 10 to change. Since general optical copying devices are not able to know the optical storage device 10 is provided with a protection mechanism, i.e. the polarizing layer 11, they are not able to obtain correct data from the optical storage device 10 via the special multi-reading mechanism mentioned above. That is, what is copied or reproduced by the general optical copying devices is the set of physical data codes 17 that contains incorrect data and could not be executed by a general optical reading device. Therefore, the optical storage device 10 is protected against copying without authorization by users and the author's copyright is effectively guarded.

Figure 5A:
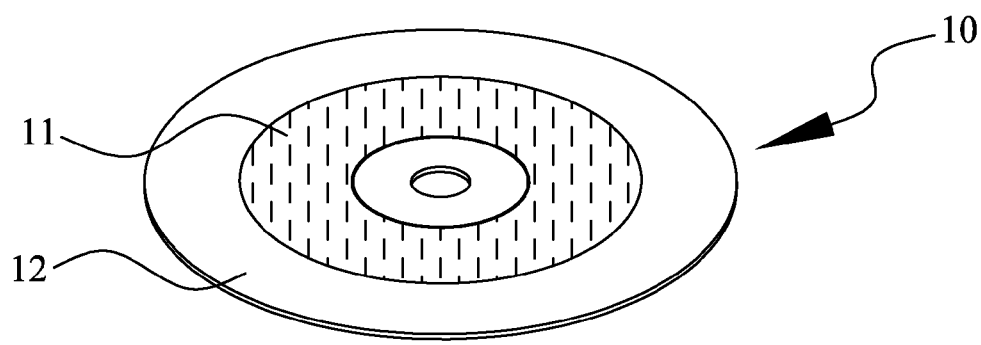
FIGS. 5A to 5C illustrate that, according to the copy protection method of the present invention, a polarizing layer may be formed on the optical storage device at different areas.
Figure 5B:
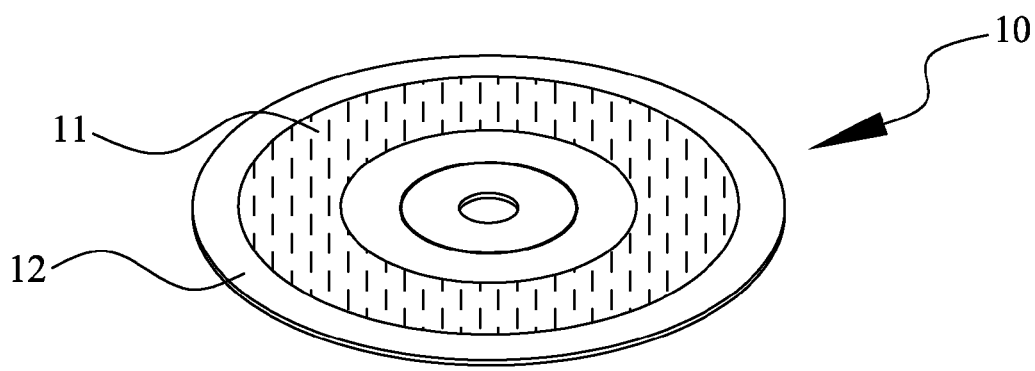
Figure 5C:
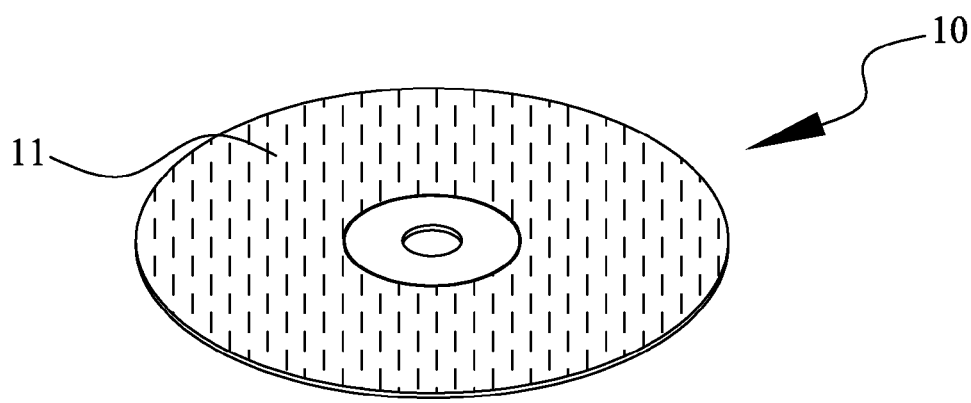

Please refer to FIGS. 5A and 5B. In the above-described two preferred embodiments of the present invention, the polarizing layer 11 can be simply formed on only a partial area of the data structure layer 12. In FIG. 5A, the polarizing layer 11 is formed on a radially innermost area of the data structure layer 12. In FIG. 5B, the polarizing layer 11 is formed on a radially middle area of the data structure area 12. On the other hand, as shown in FIG. 5C, the polarizing layer 11 can, of course, be formed on a whole area of the data structure layer 12 to cover the same. Further, while not shown, the polarizing layer 11 can be otherwise formed on multiple discontinuous areas of the data structure layer 12.

Figure 6A:
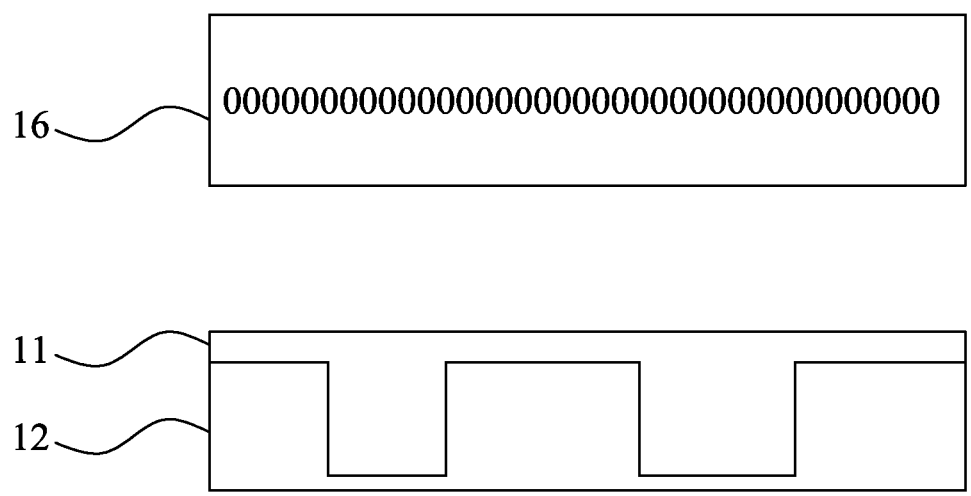
FIGS. 6A and 6B illustrate the polarizing layer formed on the optical storage device manufactured with the copy protection method of the present invention changes the data codes that can be obtained by an optical reading device.

Please refer to FIG. 6A. When the number of times the optical reading device 20 projects the light beam on the optical storage device 10 does not exceed the preset value, the polarizing layer 11 would not react at the reading to govern the light beam projected by the optical reading device 20, and the optical reading device 20 is able to read, decode and obtain the set of raw data codes 16.

Figure 6B:
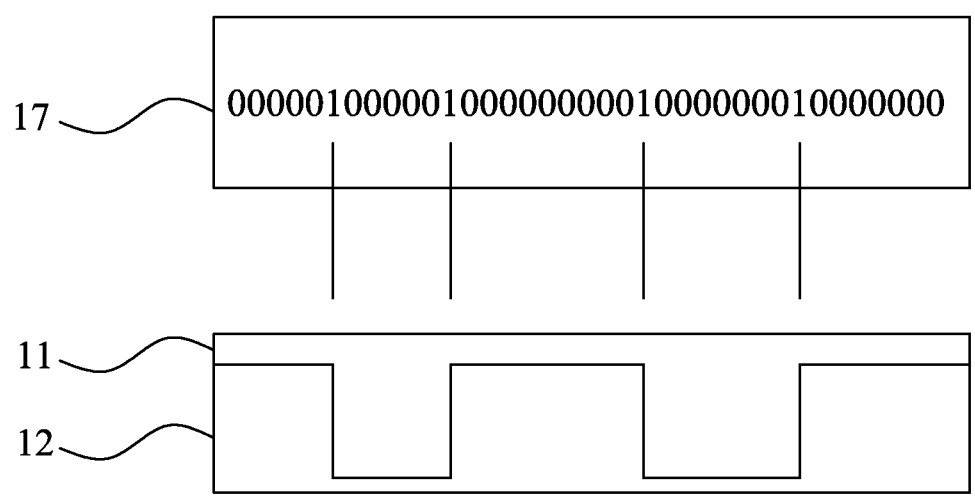

On the other hand, as shown FIG. 6B, when the number of times the optical reading device 20 projects the light beam on the optical storage device 10 exceeds the preset value, the polarizing layer 11 would react at the reading to change irreversibly or temporarily to govern the light beam projected by the optical reading device 20, and the optical reading device 20 can read, decode and obtain the set of physical data codes 17, which is different from the set of raw data codes 16.

Therefore, when the optical reading device 20 reads the optical storage device 10 repeatedly, either the set of raw data codes 16 or the set of physical data codes 17 is decoded. The optical reading device 20 checks and finds the difference between the raw data codes 16 and the physical data codes 17 via a relevant application program to determine whether there is a polarizing layer 11 on the optical storage device 10. Since optical discs copied without authorization by the dishonest users do not include any polarizing structure provided according to the present invention, an optical storage device 10 can be easily determined as a product with or without authorization simply by checking whether there is any polarizing layer 11 formed on the optical storage device 10.

In summary, the present invention provides a technology for protecting optical storage devices against copying without authorization. According to the present invention, a photosensitive, a light-degradable or a periodically changeable chemical or attachable sheet, or any other polarizing material capable of causing a change in a light beam is added to the surface of an optical storage device during the manufacturing process thereof, so that the same one block of the optical storage device that is read multiple times in a normal way would produce some polarizing effect, such as becoming transparent, reflective or refractive, after being irradiated by an intensive light beam to thereby govern the reading result. As a result, copied optical storage devices without authorization can be easily recognized because they fail to include the polarizing structure provided according to the present invention.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A copy protection method for optical storage device, comprising the following steps: providing an optical storage device, which includes a substrate layer and a data structure layer coated on a top of the substrate layer which containing a set of raw data codes; forming on a top of the data structure layer at least one polarizing layer capable of causing a change in a beam of light irradiated thereon by an optical reading device; and forming on a top of the polarizing layer a protective layer for protecting the polarizing layer, the data structure layer and the substrate layer against scratches; whereby when using the optical reading device to access the data structure layer on the optical storage device, the polarizing layer is located in-between the data structure layer and the optical reading device to govern the light beam irradiated thereon by the optical reading device, so that the set of raw data codes contained in the data structure layer being optically accessed is conditionally converted into a different set of physical data codes.

2. The copy protection method for optical storage device as claimed in claim 1, wherein the polarizing layer is formed of a type of chemical that is subject to an irreversible change, and the chemical being selected from the group consisting of a photosensitive chemical and a light-degradable chemical.

3. The copy protection method for optical storage device as claimed in claim 2, further comprising the following steps: causing the optical reading device to obtain the set of raw data codes when the number of times the optical storage device is read by the optical reading device does not exceed a value preset for causing a change in the polarizing layer, and determining the optical storage device is being used with authorization.

4. The copy protection method for optical storage device as claimed in claim 2, further comprising the following steps: causing an irreversible conversion of the set of raw data codes into the set of physical data codes according to a change of the polarizing layer when the number of times the optical storage device is read by the optical reading device exceeds a value preset for causing the change in the polarizing layer; causing the optical reading device to obtain the set of physical data codes; and determining the optical storage device is being used without authorization.

5. The copy protection method for optical storage device as claimed in claim 1, wherein the polarizing layer is formed of a type of chemical that is subject to a periodically temporary change.

6. The copy protection method for optical storage device as claimed in claim 5, further comprising the following step: causing the optical reading device to obtain the set of raw data codes when the number of times the optical storage device is read by the optical reading device does not exceed a value preset for causing a change in the polarizing layer, and determining the optical storage device is being used without authorization.

7. The copy protection method for optical storage device as claimed in claim 5, further comprising the following steps: causing a temporary conversion of the set of raw data codes into the set of physical data codes according to a change of the polarizing layer when the number of times the optical storage device is read by the optical reading device exceeds a value preset for causing the change in the polarizing layer; causing the optical reading device to obtain the set of physical data codes; and determining the optical storage device is being used with authorization.

8. The copy protection method for optical storage device as claimed in claim 7, further comprising the following step: causing the set of physical data codes to be converted back into the set of raw data codes when the optical storage device is not irradiated by a light beam again within a preset period of time.

9. The copy protection method for optical storage device as claimed in claim 1, wherein the polarizing layer is formed on the data structure layer in a manner selected from the group consisting of spray coating, attaching, and plating.

10. The copy protection method for optical storage device as claimed in claim 1, wherein the optical storage device has an optical disc specification selected from the group consisting of CD (Compact Disc), VCD (Video Compact Disc), DVD (Digital Versatile Disc), EVD (Enhanced Versatile Disc), FVD (Forward Versatile Disc), FWD (High-definition Versatile Disc), VMD (Versatile Multilayer Disc), UMD (Universal Media Disc), and BD (Blu-ray Disc); and wherein the polarizing layer is selectively formed on at least a partial area or on a whole area between the data structure layer and the protective layer.

* * * * *